United States Patent
Tanis et al.

(10) Patent No.: US 7,223,167 B2
(45) Date of Patent: May 29, 2007

(54) ANTI-WIND WIPER WITH ADJUSTABLE EXTENSION

(75) Inventors: Dale R. Tanis, Geneseo, IL (US);
Craig E. Murray, Geneseo, IL (US);
Mark J. Svitak, Colona, IL (US)

(73) Assignee: CNH America LLC, New Holland, PA (US)

( * ) Notice: Subject to any disclaimer, the term of this patent is extended or adjusted under 35 U.S.C. 154(b) by 64 days.

(21) Appl. No.: 11/097,899

(22) Filed: Apr. 1, 2005

(65) Prior Publication Data
US 2006/0223598 A1    Oct. 5, 2006

(51) Int. Cl.
*A01F 12/00*    (2006.01)
(52) U.S. Cl. .......................................... 460/68; 460/70
(58) Field of Classification Search ................. 460/66, 460/67, 68, 70, 71, 72
See application file for complete search history.

(56) References Cited

U.S. PATENT DOCUMENTS

| | | | |
|---|---|---|---|
| 2,493,105 A | 1/1950 | Bunting ........................ | 130/27 |
| 3,481,343 A | 12/1969 | Van Buskirk ................. | 130/27 |
| 3,534,742 A | 10/1970 | Knapp ........................... | 130/27 |
| 3,794,047 A | 2/1974 | De Coene et al. ............. | 130/27 |
| 3,848,609 A | 11/1974 | Mortier et al. ................. | 130/27 |
| 3,982,549 A | 9/1976 | De Pauw et al. .............. | 130/27 |
| 3,995,645 A | 12/1976 | Rowland-Hill ................ | 130/27 |
| 4,136,704 A | 1/1979 | Dyke ............................ | 130/27 |
| 4,149,360 A | 4/1979 | Rowland-Hill ............... | 56/14.6 |
| 4,175,568 A | 11/1979 | Nooyen ..................... | 130/27 T |
| 4,248,248 A | 2/1981 | De Busscher et al. ......... | 130/27 |
| 4,250,896 A | 2/1981 | Wagstaff et al. ............... | 130/27 |
| 4,266,560 A | 5/1981 | Powell et al. .................. | 130/27 |
| 4,269,200 A | 5/1981 | Gorsler ......................... | 130/27 |
| 4,344,442 A | 8/1982 | Torland et al. ................ | 130/27 |
| 4,653,515 A | 3/1987 | Tophinke ...................... | 130/27 |
| 4,733,672 A | 3/1988 | Tophinke .................. | 130/27 T |
| 4,900,290 A | 2/1990 | Tanis ............................ | 460/70 |
| 4,936,810 A | 6/1990 | Strong et al. .................. | 460/69 |
| 4,946,419 A | 8/1990 | Cromheecke et al. ......... | 460/68 |
| 4,964,838 A | 10/1990 | Cromheecke et al. ......... | 460/66 |
| 4,986,794 A | 1/1991 | Ricketts ........................ | 460/67 |
| 5,145,462 A | 9/1992 | Tanis et al. .................... | 460/68 |
| 5,257,959 A | 11/1993 | Tanis ............................ | 460/67 |
| 5,364,306 A | 11/1994 | Soots et al. .................... | 460/68 |
| 5,387,153 A | 2/1995 | Tanis ............................ | 460/68 |
| 5,454,758 A | 10/1995 | Tophinke et al. .............. | 460/68 |
| 5,562,540 A | 10/1996 | Balmer ......................... | 460/65 |
| 5,919,086 A | 7/1999 | Derry ............................ | 460/72 |
| 6,036,598 A | 3/2000 | Harden et al. ................. | 460/66 |
| 6,050,894 A | 4/2000 | Johnson ........................ | 460/68 |
| 6,083,102 A | 7/2000 | Pfeiffer ......................... | 460/68 |
| 6,129,629 A | 10/2000 | Dammann et al. ............ | 460/67 |
| 6,296,566 B1 | 10/2001 | Tanis et al. .................... | 460/70 |

(Continued)

*Primary Examiner*—Thomas B. Will
*Assistant Examiner*—Alicia Torres
(74) *Attorney, Agent, or Firm*—Michael G. Harms; John William Stader; Stephen A. Bucchianeri (57) ABSTRACT

An anti-wind wiper including an extension adjustably mountable in a desired spaced relation and angular orientation relative to a leading edge of a flight of a front rotor inlet section of a combine, for interaction with the flight during rotation of the rotor, for directing and guiding crop material, particularly long strand-like elements of crop material, away from a shaft and bearing supporting the inlet section.

26 Claims, 5 Drawing Sheets

U.S. PATENT DOCUMENTS

| | | | |
|---|---|---|---|
| 6,679,773 B2 | 1/2004 | Schwersmann | 460/70 |
| 6,688,970 B2 | 2/2004 | Tanis | 460/68 |
| 6,719,626 B2 | 4/2004 | Federowich | 460/70 |

ANTI-WIND WIPER WITH ADJUSTABLE EXTENSION

TECHNICAL FIELD

The present invention relates generally to an agricultural combine rotor, and more particularly, to an adjustable extension for an anti-wind wiper for a support for a front rotor inlet section, for interaction with flights on the front rotor inlet section, for directing crop material, and particularly long strand like elements of crop material, away from a shaft and bearing supporting the inlet section.

BACKGROUND ART

A well-known form of harvesting machine is a rotary combine. A typical combine includes a crop harvesting apparatus which reaps grain stalks and other plant materials and feeds them to a separating or threshing apparatus. The grain stalks or other crop and plant materials harvested in the field are moved rearwardly from a crop harvesting header assembly and introduced for threshing to the rotor assembly by a crop feeder assembly.

In a rotary combine, the rotor assembly includes a generally tubular rotor housing mounted in the combine body. A driven rotor is coaxially mounted within the housing. The rotor comprises an infeed or inlet section and a cylindrical threshing section, and is supported at opposite ends by front and rear bearing assemblies.

The cylindrical threshing section of the rotor and the rotor housing mount cooperating threshing elements, which separate grain from other material in a threshing zone. The crop material is threshed as it spirals around the rotor threshing section and passes through openings in the rotor housing.

As discussed in Tanis U.S. Pat. No. 5,387,153, assigned to the same assignee as the present invention, the ability to transfer crop materials from the feeder assembly to the threshing zone of the rotor assembly is a key to efficient combine operations. Most rotary combine rotors include an infeed or inlet section impeller comprised of a series of impeller blades or flights arranged at a forward end of the rotor. The impeller flights rotate within a housing which is a part of the rotor housing. During harvesting operations, the generally linear movement of the crop materials received from the feeder assembly is converted by the rotating impeller flights into a rotating, circulatory movement, in a rearward and outward direction.

When rotary combines are used on certain long-stemmed leguminous or grassy crops, such as windrowed perennial or annual rye grass, clover, and bent grass, and oats, there is a potential for portions of such grassy crops and other plant materials such as weeds to extend into the impeller flights while other portions remain partially engaged with the feeder assembly. The latter portions tend to move toward the axis of rotation of the rotor assembly, and may wrap about the front rotor bearing or shaft. This can rob power and cause damaging heat build up around the bearing, potentially causing premature failure thereof.

Long-stemmed leguminous or grassy crops also have a tendency to wrap around or "hairpin" about the leading edge of the impeller blades or flights. This hairpinning action can create a buildup of crop materials on the aforementioned leading edge, which reduces the effectiveness of the impeller and further reduces combine efficiency.

Numerous front rotor inlet and bearing housing designs, including that disclosed in the above referenced Tanis patent, have been proposed to prevent crop materials from becoming entangled with the front rotor bearing and prevent hairpinning about the impeller blades' leading edges. None has been thoroughly successful in doing so, however.

Tanis U.S. Pat. No. 6,296,566, also assigned to the same assignee as the present invention, discloses an infeed impeller for a rotary combine which utilizes anti-winding vanes on the rotor which cooperate with vanes on the front bearing assembly to force debris radially outwardly away from the axis of the rotor. However, this combination has been found to also suffer from the above-discussed shortcomings, more particularly, that long, particularly wet, crop material winds onto the rotor shaft which creates heat, consumes power, and causes early bearing failures. Additionally, hairpinning of such long grassy crop material about the leading edges of the impeller blades or flights can result in irregular wear in the form of scalloping of the leading edges, which can impede smooth flow of crop material radially outwardly along the leading edges.

Accordingly, what is sought is a front bearing housing anti-wind element and/or front rotor inlet section which provides improved anti-wind characteristics, particularly with regard to long, wet straw and other crop material.

SUMMARY OF THE INVENTION

What is disclosed is a front bearing housing anti-wind element which provides improved anti-wind characteristics, particularly with regard to long, wet straw and other crop material.

According to a preferred aspect of the invention, an adjustable anti-wind wiper is disclosed, including an elongate wiper extension having a first longitudinal end portion adjustably mountable on structure supporting an inlet end of a rotor of a combine for rotation about a rotational axis, such that the wiper extension will extend generally radially outwardly in relation to the axis, to an opposite second end portion of the wiper extension. When so mounted, the extension is in predetermined axially spaced relation to a radially outwardly extending leading edge of an inlet flight of the rotor, and can optionally also be oriented at a desired angle in relation thereto. The preferred wiper extension has a longitudinal edge extending between the longitudinal end portions of the extension, the extension being adjustably movable during the mounting thereof, for positioning the longitudinal edge, and also a wiper surface of the extension, in a desired axially spaced relation to the leading edge of the inlet flight, and optionally, in a desired angular orientation in relation thereto, the extension then being fixedly securable to the structure.

As a result, the relationship, both axially spaced, and angular, of the extension to a leading edge of one or more inlet flights of a rotor can be customized and adjusted for such conditions as manufacturing tolerances and wear. The wiper extension also allows making adjustments to the spacing between the extension and an inlet flight as required or desired, and replacement of the extension when worn and/or damaged.

BRIEF DESCRIPTION OF THE DRAWINGS

Preferred aspects of the invention, including of its construction and method of operation, are illustrated more or less diagrammatically in the drawings, in which.

DETAILED DESCRIPTION OF THE INVENTION

Figure 1:
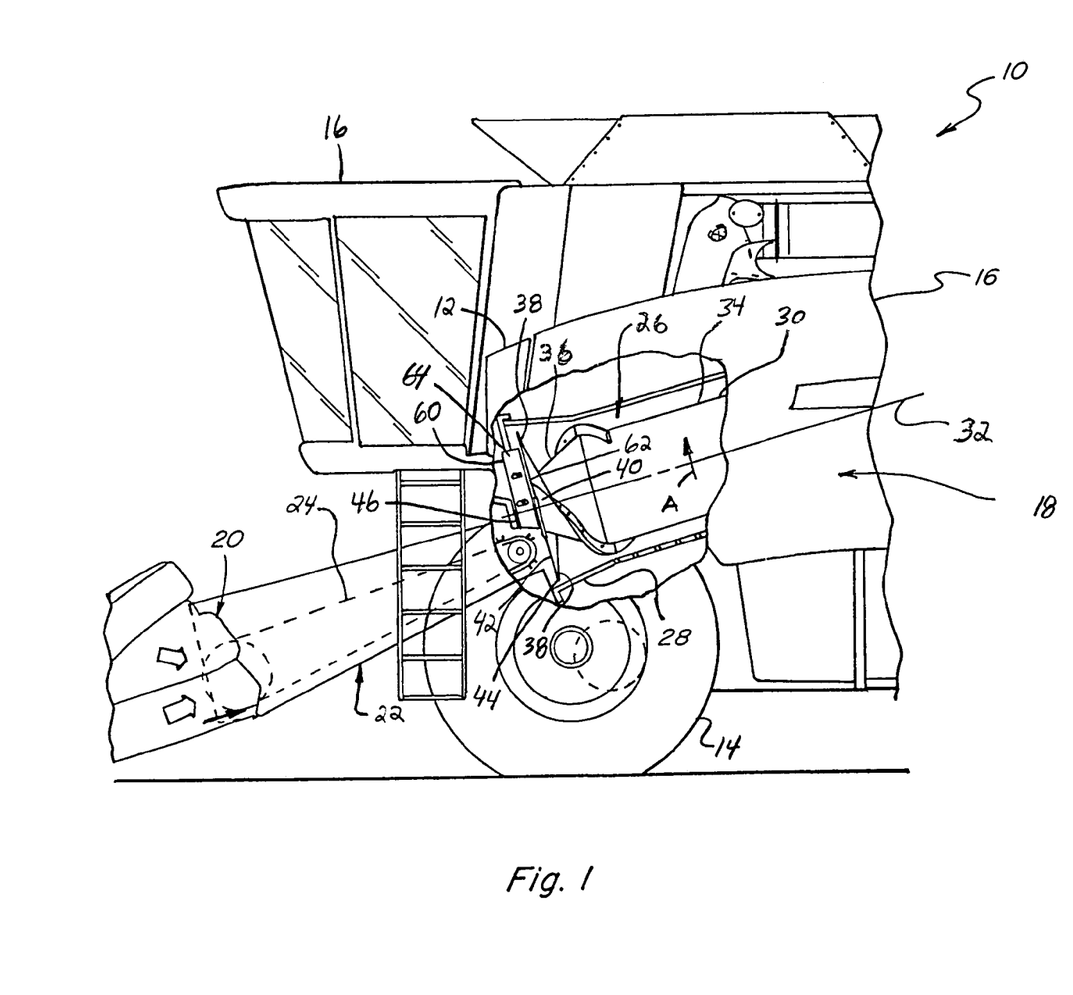
FIG. 1 is a side elevational view of a portion of a rotary combine, showing in partial section a crop feeder assembly, and a threshing rotor including a front inlet section thereof and a front bearing housing shroud assembly, including an adjustable anti-wind wiper extension according to preferred aspects of the invention.

Referring now to the drawings, in FIG. 1 a self-propelled rotary combine is seen generally at 10. Combine 10 includes a front portion 12 including front wheels 14, an operator cab 16, and an engine (not shown) suitably supported within a body 18. The transfer of power from the engine to various driven components of combine 10 is effected conventionally.

Combine 10 is provided with a crop harvesting header assembly 20 for cutting and gathering crop materials. Header assembly 20 cuts and directs the crop material into a crop feeder assembly 22 including a conveyor 24. Conveyor 24 carries the crop material upwardly toward a rotor assembly 26, which threshes grain from material other than the grain. Rotor assembly 26 is supported in a conventional manner inside body 18. Rotor assembly 26 includes a tubular rotor housing 28 mounted in a front to rear orientation in body 18. A rotor 30 is mounted in housing 28 for rotation therein in a predetermined rotational direction about a rotational axis 32 through rotor 30 oriented at an acute angle to horizontal as shown.

Figure 2:
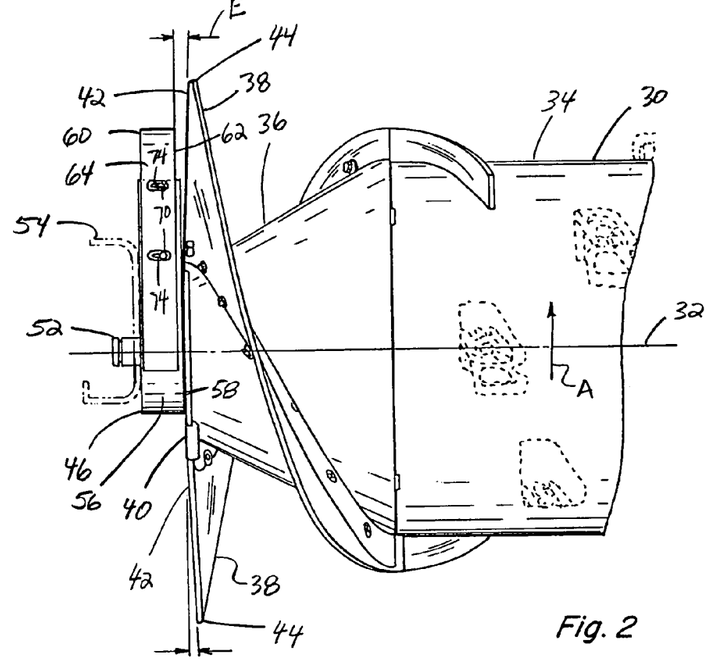
FIG. 2 is an enlarged fragmentary side view of the rotor and front inlet section of FIG. 1.

Referring also to FIG. 2, rotor 30 is a hollow drum including a threshing section 34 and a front inlet section 36. Front inlet section 36 includes two helical impeller auger flights 38 extending therearound in a rearward direction from a front center portion 40 to threshing section 34. Front inlet section 36 has a conical shape, extending radially outwardly relative to axis 32 rearwardly from adjacent to front center portion 40 to threshing section 34. Rotor 30 is rotatable in rotor housing 28 in a rotational direction denoted by arrow A, which is a counterclockwise direction when viewed from the front. Each impeller auger flight 38 includes a leading edge 42 which extends radially outwardly with respect to axis 32 from a radial outer circumferential edge of front center portion 40 having a predetermined radial extent, and terminating at a radial outer edge 44. Edges 42 are raked or swept back in relation to rotational direction A. Each impeller auger has a helical pitch that increases in the rearward direction along the length thereof, which enables auger flight 38 to aggressively move plant material rearwardly from feeder assembly 22 during rotation of rotor 30, while leading edges 42 are disposed and rotate in closely axially spaced relation to a shroud 46 which extends around and protects a front bearing housing 48 (FIGS. 3 and 5) carrying a front bearing 50 (FIG. 5) for supporting a shaft 52, which, in turn, supports inlet section 36 and flights 38 of rotor 30 for rotation.

Figure 3:
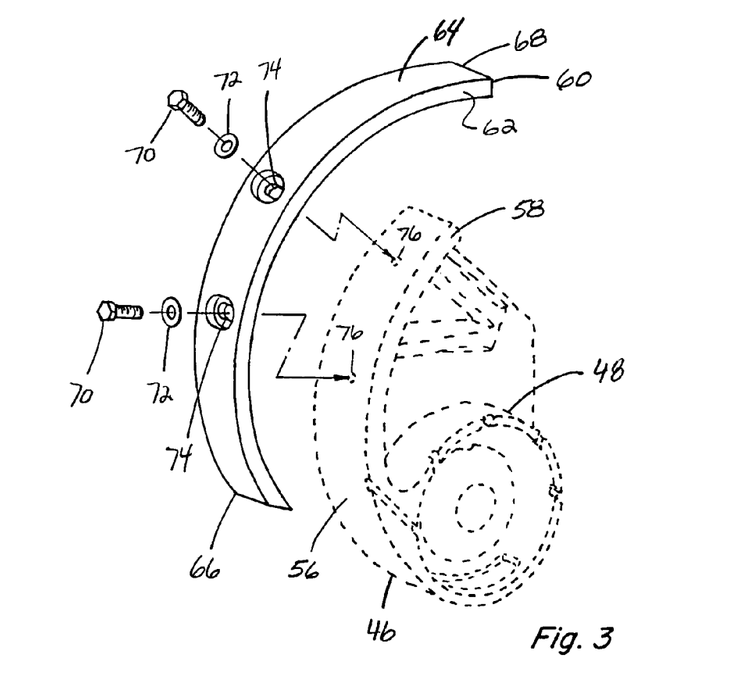
FIG. 3 is a perspective view of the wiper extension of FIG. 1, showing elements for installation on the shroud assembly, shown in dotted lines.
Figure 4:
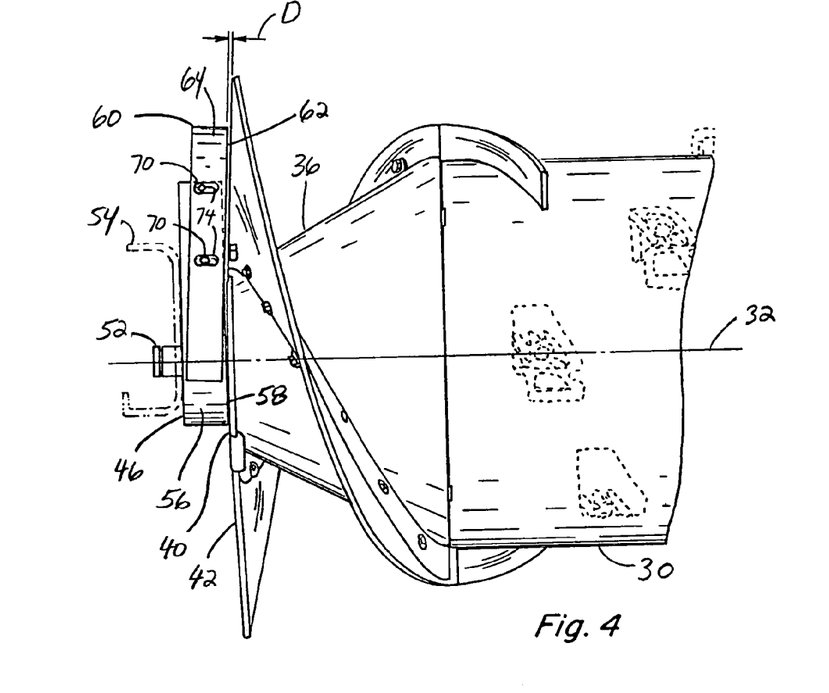
FIG. 4 is a side view of the front rotor inlet section of FIG. 1, showing the wiper extension in relation thereto.
Figure 5:
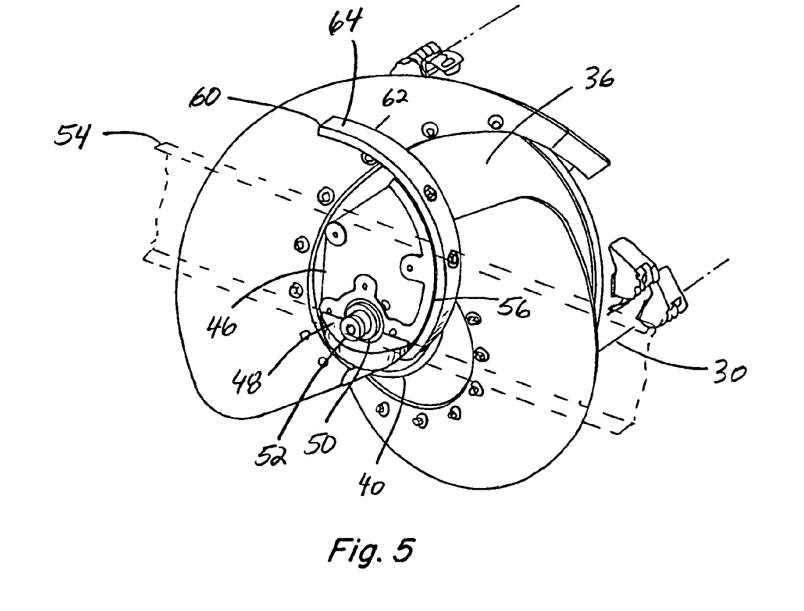
FIG. 5 is another perspective view of the rotor, shroud assembly and wiper extension of FIG. 1.

More particularly referring to FIGS. 3, 4 and 5, shroud 46 is mounted on a support arm 54 frontwardly of inlet section 36 of rotor 30, and is preferably integrally formed or cast with front bearing housing 48. Front bearing housing 48 contains and carries conventional bearing 50 for rotatably supporting shaft 52 for rotation about axis 32, shaft 52 being affixed to and rotatably carrying and supporting inlet section 36 in the conventional manner. Shroud 46 has a curved radial outer wiper surface 56 extending at least partially therearound, and a rearwardmost curved anti-wind wiper edge 58 disposed so as to be spaced just marginally frontwardly of front center portion 40 and leading edges 42 of flights 38. Radial outer wiper surface 56 includes an elongate adjustable anti-wind wiper extension member 60 according to the invention, that extends generally radially outwardly preferably at least generally tangentially from surface 56 in the rotational direction denoted by arrows A and includes a longitudinally extending wiper edge 62 which partially overlays or forms an extension of anti-wind wiper edge 58.

Extension member 60 of the invention includes a longitudinally extending radial outer wiper surface 64 having a convex, curved shape which overlays a portion of wiper surface 56 of shroud 46, and extends generally radially outwardly in direction of rotation A beyond wiper surface 56, effectively forming an extension thereof. Wiper surface 56 and wiper edge 58 of shroud 46, and wiper edge 62 and wiper surface 64 of extension member 60 are preferably curved so as to extend gradually radially outwardly in rotational direction A about axis 32, so as to be capable of smoothly guiding crop material brought into contact therewith by rotation of auger flights 38, particularly long crop material such as grassy strands of crop material hairpinned about leading edges 42, radially outwardly and away from the vicinity of front bearing housing 48 and shaft 32, preferably to radial outer edge 44, where the crop material will be released from leading edges 42, so as to be carried rearwardly by flights 38. As a result of the radial outward movement of the crop material along leading edges 42 to the radial outer ends thereof, the crop material is not concentrated at any one location therealong, such that occurrences of sawing or abrading of any one portion, or location along, leading edges 42 by the crop material is eliminated. Here, it should be understood that by the term "hairpinning", what is meant is that the long strands or other elements of the crop material bend about leading edges 42 of flights 38, such that a portion of the long element is in front of the flight, and a portion is rearward of the flight.

Figure 6:
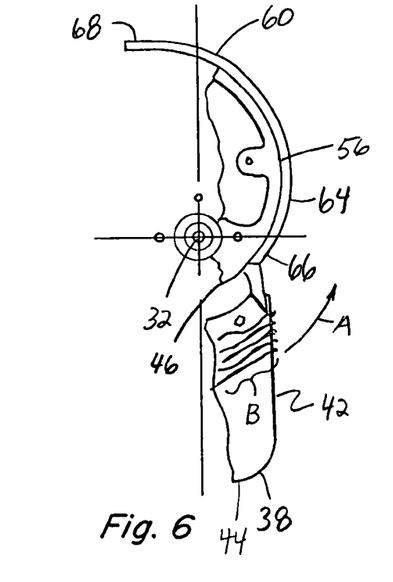
FIG. 6 is a front view of the front rotor inlet section and the front bearing housing and shroud of FIG. 1, illustrating a relationship between the extension and a flight of the rotor in one rotational position.
Figure 7:
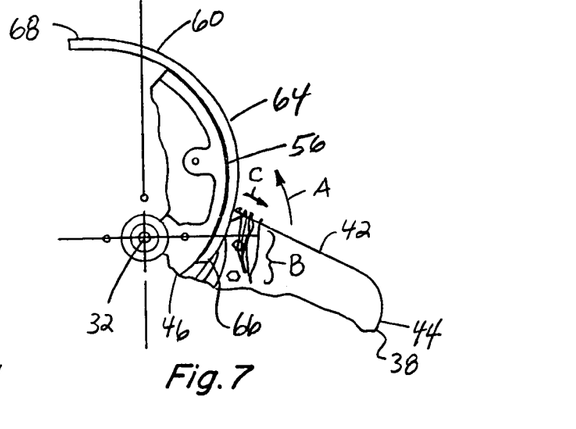
FIG. 7 is another front view of the front rotor inlet section and the front bearing housing and shroud of FIG. 1, showing a relationship between the extension and a flight of the rotor in another rotational position.
Figure 8:
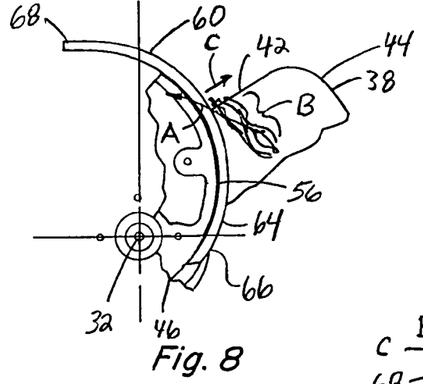
FIG. 8 is another front view of the front rotor inlet section and the front bearing housing and shroud of FIG. 1, showing a relationship between the extension and a flight of the rotor in another rotational position.
Figure 9:
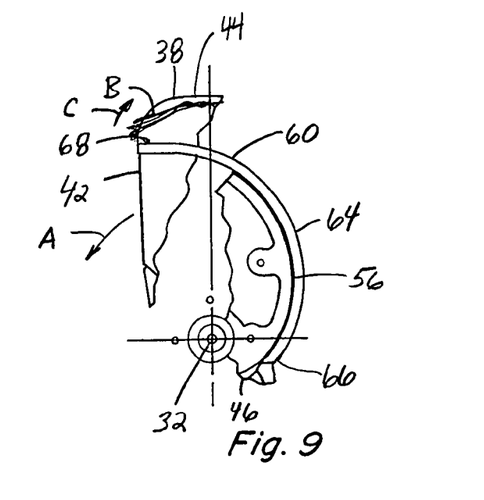
FIG. 9 is another front view of the front rotor inlet section and the front bearing housing and shroud of FIG. 1, showing a relationship between the extension and a flight of the rotor in still another rotational position.

This is best illustrated in reference to FIGS. 6, 7, 8 and 9, wherein the relative rotational positions of an auger flight 38 and shroud 46 about axis 32 is shown. The view in each of FIGS. 6, 7, 8 and 9 is looking rearward. In FIG. 6, flight 38 is shown at a lower rotational position wherein leading edge 42 thereof is spaced below shroud 46 and is rotating in direction A toward wiper surface 64 of extension member 60. Long crop material, denoted collectively by B, is shown hairpinned about leading edge 42. In FIG. 7, leading edge 42 of flight 38 is rotating in direction A about axis 32, along wiper surface 64 of extension 60, such that more radially inwardly located elements of the crop material B are in contact with, and moving in direction A with flight 38 along wiper surface 64. Because wiper surface 64 extends radially outwardly in direction A, the crop material in contact therewith is being urged radially outwardly thereby, along leading edge 42, as denoted by arrow C. Here, it should be noted that the included angle between leading edge 42 and surface 64 is greater than 90° such that radial outward movement of the crop material B along edge 42 is not impeded, and scissoring action is not occurring. In FIG. 8, flight 38 is shown rotated to a more upwardly oriented position along surface 64 of extension 60, leading edge 42 still being oriented at at least a 90° angle to surface 64. Here, it can be observed that crop material B is still being moved radially outwardly along leading edge 42, as denoted by arrow C. And, in FIG. 9, flight 38 is shown at a rotational position wherein surface 64 of extension member 60 has reached a radial outermost end of leading edge 42 adjacent to radial outer edge 44, such that crop material B will be released from leading edge 42 so as to be carried rearwardly by the flight. From a sequential review of FIGS. 6, 7, 8 and 9, it should be evident that crop material carried into contact with extension member 60 and carried along surface 64 thereof by leading edge 42 of flight 38 will be progressively urged radially outwardly toward radial outer edge 44, as denoted by arrows C, so as to be released from leading edge 42 and carried rearwardly on the oppositely facing surface of flight 38, toward threshing section 34. Here, it can also be observed that extension member 60 has a first longitudinal end portion 66 mounted in overlaying relation to wiper surface 56 of shroud 46, relatively close to axis 32, and that extension member 60, edge 62 and wiper surface 64 extend generally progressively radially outwardly in rotational direction A along wiper surface 56 to a second longitudinal end portion 68 of member 60 which is located radially outwardly of a radial outermost portion of shroud 46 in rotational direction A. Thus, a significant extension of shroud 46 is provided, which, in relation to the radial outward extent of leading edge 42 of each flight 38, provides a capability of guiding and urging crop material radially outwardly along leading edge 42 of each flight during the rotation thereof, sufficiently so as to be released therefrom, particularly if bent or hairpinned thereover.

Referring more particularly to FIGS. 1, 2 and 4, it is evident that some axial space or gap must exist between wiper edges 58 and 62 of shroud 46 and extension member 60, and leading edges 42 of flights 38, such that there is no contact therebetween. As a result of manufacturing and assembly tolerances when installing a rotor 30 in the support structure therefor, namely, shroud 46 and bearing housing 48 on support arm 54, variances in such axial space or gap can exist. Additionally, as a result of use, particularly with more abrasive varieties of crops, leading edges 42 can be abraded away to some extent, as can wiper edge 58 and other surfaces of shroud 46, and the corresponding surfaces on extension member 60 when used. Thus, both at installation, and subsequently after periods of use, the gap and angular relationship between leading edges 42 and edge 58 of shroud 46, and edge 62 of extension member 60, when used, can change. Additionally, shroud 46, surface 56 and edge 58 thereof can be damaged from contact with other material which may be inadvertently inducted with the harvested crop materials, such as rocks, fence posts, animal carcasses and skeletal remains, and the like which may be fed by feeder assembly 22 into rotor housing 28. Accordingly, for the above reasons, it has been found that it is desirable to provide an extension member 60 for shrouds such as shroud 46, and further, for such an extension member 60 to be adjustably mountable in relation to shroud 46 to achieve desired performance, and/or to compensate for the above-described variances, wear and possible damage, and it is replaceable if required, by a duplicate extension member, or one that has one or more different characteristics or properties. Additionally, by usage of an extension member installable in the manner as described herein, such installation, and adjustment can be achieved without major disassembly of the support structure for the inlet end of the rotor.

Referring more particularly to FIGS. 2, 3 and 4, another advantage of extension member 60 is that it can be installed at or in a desired or required position and/or angular orientation in relation to a desired or required reference, such as in a desired or required position and/or orientation in relation to fixed structure such as a reference on support arm 54 or shroud 46, or, more preferably, in a desired or required axially spaced relation and/or orientation in relation to a leading edge 42 of one or more of inlet flights 38. In particular, it is anticipated that utility would be achieved by positioning wiper edge 62 at a predetermined distance, denoted by distance D in FIG. 4, from the leading edge 42 of one or both flights 38, which distance have a nominal value, for instance, of about 2.3 millimeters, or a range of distances, for instance, from about 2.0 to about 3.0 millimeters. An angular orientation of wiper edge 62 in relation to a reference such as leading edge 42, as illustrated by angle E in relation to leading edge 42 in FIG. 2, or a line transverse or perpendicular to axis 32, can also be specified, as desired or required for a particular application. For instance, angle E can have a nominal value of 0 degrees, and a predetermined range or tolerance of 1 or 2 degrees therefrom. Here, it should be noted that the values set forth for distance D and angle E are not limiting, and may differ for different applications. To facilitate and enable such variable mountability of extension member 60 on shroud 46, first end portion 66 of member 60 is preferably mounted on surface 56 of shroud using suitable mounting elements, such as, but not limited to fasteners 70 which here are shown as bolts, which extend through washers 72, and axially elongate holes 74 through first end portion 66, and are threadedly received in threaded holes 76 in surface 56 of shroud 46.

Figure 10:
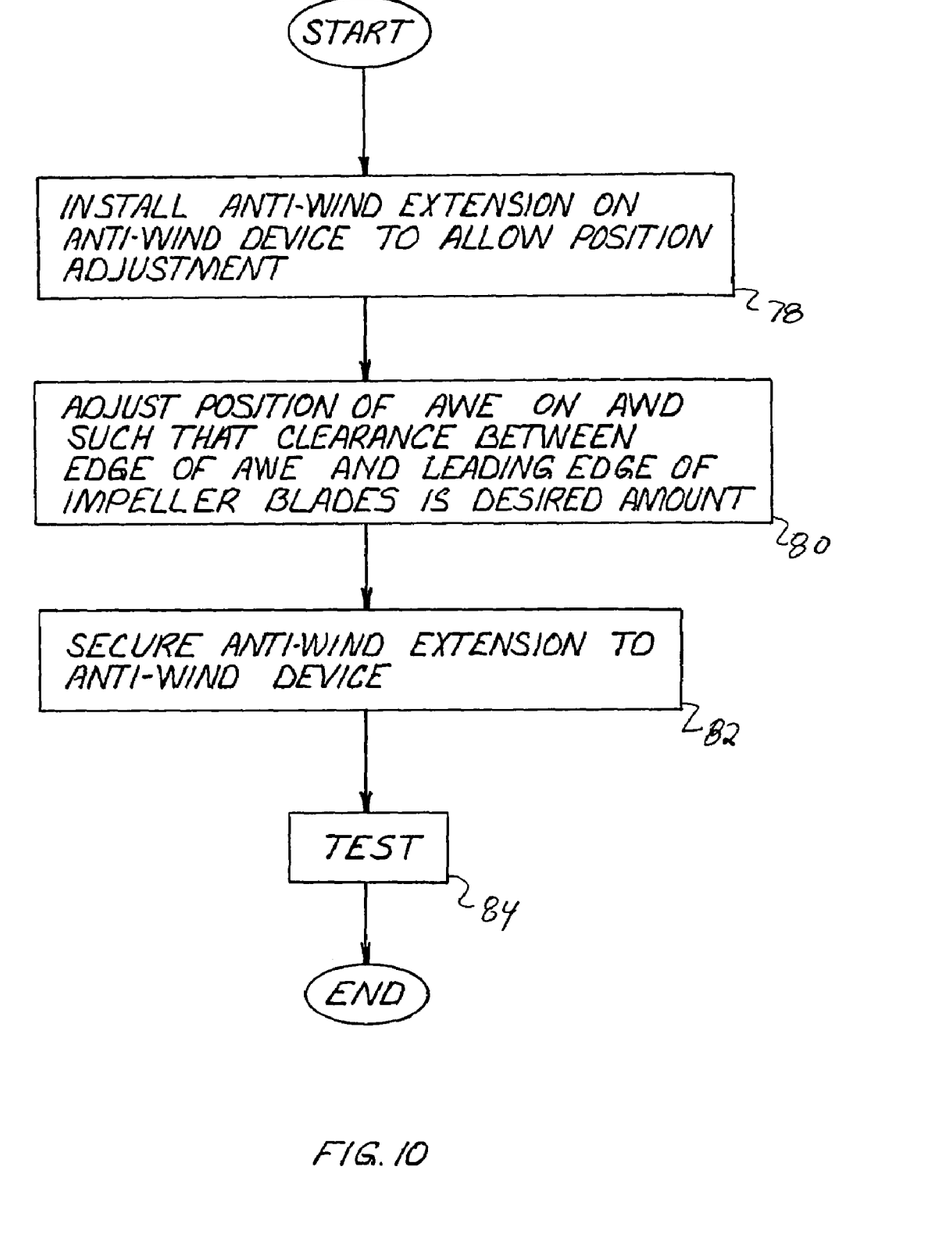
FIG. 10 is a high level flow diagram of steps of a method of the invention.

In FIG. 10, steps of installation of extension member 60 are illustrated. In step 78, the extension is loosely installed, for instance using fasteners 70, to allow adjusting the position of the extension in relation to a selected reference, such as a leading edge 42 of a flight 38 as discussed above. In step 80, the position of the extension is adjusted, for instance, such that a clearance value, (distance D in FIG. 4) is the desired amount. In Step 82, the extension is secured in position, for instance, by tightening fasteners 70. In step 84, a test is performed, for instance, by spinning rotor 30, to ensure the desired position of extension is achieved. If it is, the installation is complete.

Here, it should also be noted that the terms "rearward" and "rearwardly" are used in respect to rotor 30, as denoting toward the threshing end thereof, and not with respect to the rearward end of combine 10, as it is recognized that rotor 30 could be oriented otherwise than front to rearwardly with respect to combine 10, such as in a side to side orientation therein. Additionally, it should be noted that the terms "radial" and "radially" are used with respect to axis 32.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. An adjustable anti-wind wiper for an agricultural combine, comprising:
   an elongate wiper extension having a first longitudinal end portion adjustably mountable on structure supporting an inlet end of a rotor of a combine for rotation about a rotational axis, such that the wiper extension will extend generally radially outwardly in relation to the rotational axis and in a rotational direction of the rotor to an opposite second end portion of the wiper extension, the extension being in a predetermined axially spaced relation to a radially outwardly extending leading edge of an inlet flight of the rotor, wherein the wiper extension includes a longitudinally extending wiper surface positioned to face radially outwardly when the wiper extension is mounted on the structure, wherein the wiper surface has a curved shape so as to curve around the rotational axis in radially outwardly spaced relation thereto when mounted on the structure, and wherein the first end portion of the wiper extension includes at least one axially elongate mounting hole therethrough for receiving a fastener fastenable to the structure for adjustably mounting the extension member thereon.

2. The adjustable anti-wind wiper of claim 1, wherein the first end portion of the wiper extension is adjustably mountable on the structure so as to allow orienting the extension at a variety of angular orientations in relation to a radially outwardly extending leading edge of an inlet flight of a rotor.

3. The adjustable anti-wind wiper of claim 2, wherein the angular orientations include an orientation wherein a longitudinal edge of the extension is substantially parallel to the leading edge.

4. The adjustable anti-wind wiper of claim 2, wherein the angular orientations include a range of orientations wherein a longitudinally extending edge of the extension is oriented at an acute angle to the leading edge.

5. The adjustable anti-wind wiper of claim 1, wherein the first end portion of the wiper extension is adjustably mountable on a radially outwardly facing surface of the structure.

6. The adjustable anti-wind wiper of claim 1, wherein the structure comprises a shroud extending around a bearing supporting the inlet end of the rotor, the shroud including a radially outwardly facing wiper surface, and the first end portion of the wiper extension being adjustably mountable in overlaying relation to the wiper surface.

7. An adjustable anti-wind wiper for an inlet end of a rotor of an agricultural combine, comprising:
   an elongate extension member having a longitudinal edge extending between a first longitudinal end portion thereof and a second longitudinal end portion thereof, the first longitudinal end portion being adjustably mountable on a shroud extending at least partially around a bearing supporting an inlet end of a rotor for rotation about an axis such that the extension member extends generally radially outwardly from the shroud in a direction of rotation of the rotor, and such that the edge of the extension member can be adjustably moved at least axially relative to the shroud so as to be positionable and fixable within a range of positions in axially spaced relation to a leading edge of a flight of the rotor.

8. The adjustable anti-wind wiper of claim 7, wherein the shroud includes a radially outwardly facing wiper surface, and the first longitudinal end portion of the extension member is mountable in overlaying relation to at least a portion of the wiper surface in mating relation thereto such that the second end portion of the extension member forms an extension thereof.

9. The adjustable anti-wind wiper of claim 7, wherein the extension member comprises at least one mounting element cooperatively engageable with the shroud for adjustably mounting the extension member on the shroud for allowing at least some axial movement of the extension member relative thereto for positioning the extension member in a desired one of the positions in axially spaced relation to a leading edge of a flight of the rotor.

10. The adjustable anti-wind wiper of claim 9, wherein the at least one mounting element allows the extension member to be mounted on the shroud within a range of angular orientations in relation to the leading edge of a flight of the rotor.

11. The adjustable anti-wind wiper of claim 10, wherein the at least one mounting element includes at least one axially elongate hole therethrough adapted for receiving a fastener threadably connectable to the shroud for adjustably mounting the extension member on the shroud while allowing the extension member to be positioned in a desired position and orientation in relation to the leading edge of the flight.

12. The adjustable anti-wind wiper of claim 7, wherein the extension member is movable relative to the shroud for orienting the extension member so as to extend at a predetermined acute angle relative to a line perpendicular to the axis.

13. The adjustable anti-wind wiper of claim 7, wherein the extension member comprises a heat treated metal.

14. Apparatus for supporting an inlet end of a rotor of an agricultural combine, comprising:
   structure supporting an inlet end of a rotor for rotation in a predetermined rotational direction about a rotational axis, the inlet end having at least one helical flight having a leading edge extending radially outwardly from the rotational axis;
   a shroud mounted in connection with the structure, the shroud including a radially outwardly facing wiper surface extending circumferentially at least partially around the rotational axis, the wiper surface extending progressively radially outwardly relative to the axis in the rotational direction; and
   an elongate extension member having opposite first and second longitudinal end portions and a convex curved wiper surface extending therebetween, the first longitudinal end portion being adjustably mounted on the shroud such that the convex curved surface is oriented to face radially outwardly and extends generally radially outwardly from the wiper surface, and such that the extension member can be adjustably positioned in a predetermined axially spaced position in relation to the leading edge of the at least one flight and fixed in said position.

15. Apparatus of claim 14, wherein the leading edge of the at least one flight has a predetermined first radial outward extent relative to the rotational axis terminating at a radial outer edge, and the extension member has a predetermined second radial outward extent about equal to the first radial outward extent, such that during rotation of the rotor in the rotational direction, at least some of any crop material carried on the leading edge into contact with the extension member will be urged radially outwardly therealong to the radial outer edge.

16. Apparatus of claim 14, wherein the wiper surface has a convex curved shape and the first longitudinal end portion of the extension member is mountable in overlaying relation to a portion of the wiper surface in mating relation thereto such that the second end portion of the extension member extends generally radially outwardly therefrom.

17. Apparatus of claim 14, further comprising at least one mounting element cooperatively engageable with the shroud for adjustably mounting the extension member on the shroud for allowing at least some axial movement of the extension member relative thereto for positioning the extension member in the predetermined axially spaced position in relation to the leading edge of the at least one flight.

18. Apparatus of claim 14, wherein the extension member includes at least one axially elongate hole therethrough adapted for receiving a fastener threadably connectable to the shroud for adjustably mounting the extension member on the shroud while allowing the extension member to be positioned in the predetermined axially spaced position in relation to the leading edge of the at least one flight.

19. Apparatus of claim 14, wherein the extension member is movable relative to the shroud for orienting the extension member so as to extend at a predetermined acute angle relative to a line perpendicular to the rotational axis and is fixable on the shroud at the predetermined acute angle.

20. Apparatus of claim 14, wherein the extension member comprises a heat treated metal.

21. Apparatus for supporting an agricultural combine front inlet section for rotation in a predetermined rotational direction relative thereto about an axis extending therethrough while preventing winding of plant material therearound, the rotor front inlet section including at least one helical auger flight extending therearound including a front most leading edge extending radially outwardly from a front center portion thereof through which the axis extends, the apparatus comprising:

a shroud extending circumferentially at least partially around the axis in radially outwardly spaced relation thereto, the shroud including a radially outwardly facing curved anti-wind wiper extending substantially tangentially and radially outwardly therefrom in the predetermined radial direction and in position such that when the front rotor inlet section is rotated relative thereto in the predetermined rotational direction, the front leading edge of the auger flight will rotate in closely spaced axially opposing relation to the anti-wind wiper so as to urge plant material coming into contact therewith radially outwardly away from the front center portion; and an elongate anti-wind wiper extension adjustably mountable on the anti-wind wiper so as to extend longitudinally radially outwardly in the predetermined rotational direction such that when the front rotor inlet section is rotated relative thereto in the predetermined rotational direction, the front leading edge of the auger flight will rotate in closely spaced axially opposing relation to the anti-wiper extension so as to urge plant material radially outwardly from the anti-wind wiper, the adjustable mountability of the anti-wind wiper extension allowing positioning and fixedly mounting the extension on the wiper in a variety of angular orientations and spaced relations relative to the leading edge of the auger flight.

22. Apparatus of claim 21, wherein the anti-wind wiper includes a radially outwardly facing surface, and the anti-wind wiper extension is mountable in overlaying relation thereto.

23. Apparatus of claim 21, further comprising at least one fastener fastenable to the anti-wind wiper for mounting the anti-wind wiper extension thereto.

24. Apparatus of claim 21, wherein the anti-wind wiper extension includes an anti-wind wiper surface having a curved shape such that when the extension is mounted to the wiper, the anti-wind wiper surface of the extension will extend generally radially outwardly from the wiper in the predetermined rotational direction.

25. Apparatus of claim 21, wherein the at leading edge of the at least one helical auger flight has a predetermined radial outward extent, the anti-wind wiper has a predetermined radial outward extent which is less than the radial outward extent of the leading edge of the at one helical auger flight, and the anti-wind wiper extension has a sufficient longitudinal extent such that when mounted on the anti-wind wiper, the wiper and the extension will have a combined radial outward extent about equal to the radial outward extent of the leading edge.

26. An adjustable anti-wind wiper for an agricultural combine, comprising:

an elongate wiper extension having a first longitudinal end portion adjustably mountable on structure supporting an inlet end of a rotor of a combine for rotation about a rotational axis, such that the wiper extension will extend generally radially outwardly in relation to the rotational axis and in a rotational direction of the rotor to an opposite second end portion of the wiper extension, the extension being in a predetermined axially spaced relation to a radially outwardly extending leading edge of an inlet flight of the rotor, wherein the first end portion of the wiper extension is adjustably mountable on the structure so as to allow orienting the extension at a variety of angular orientations in relation to a radially outwardly extending leading edge of an inlet flight of a rotor.

\* \* \* \* \*